May 28, 1929.  H. B. SCOTT ET AL  1,714,926
CAM CUTTING MACHINE
Filed April 17, 1924  9 Sheets-Sheet 2

Inventors
Howard B. Scott and
Edgar Warner
By
their Attorneys

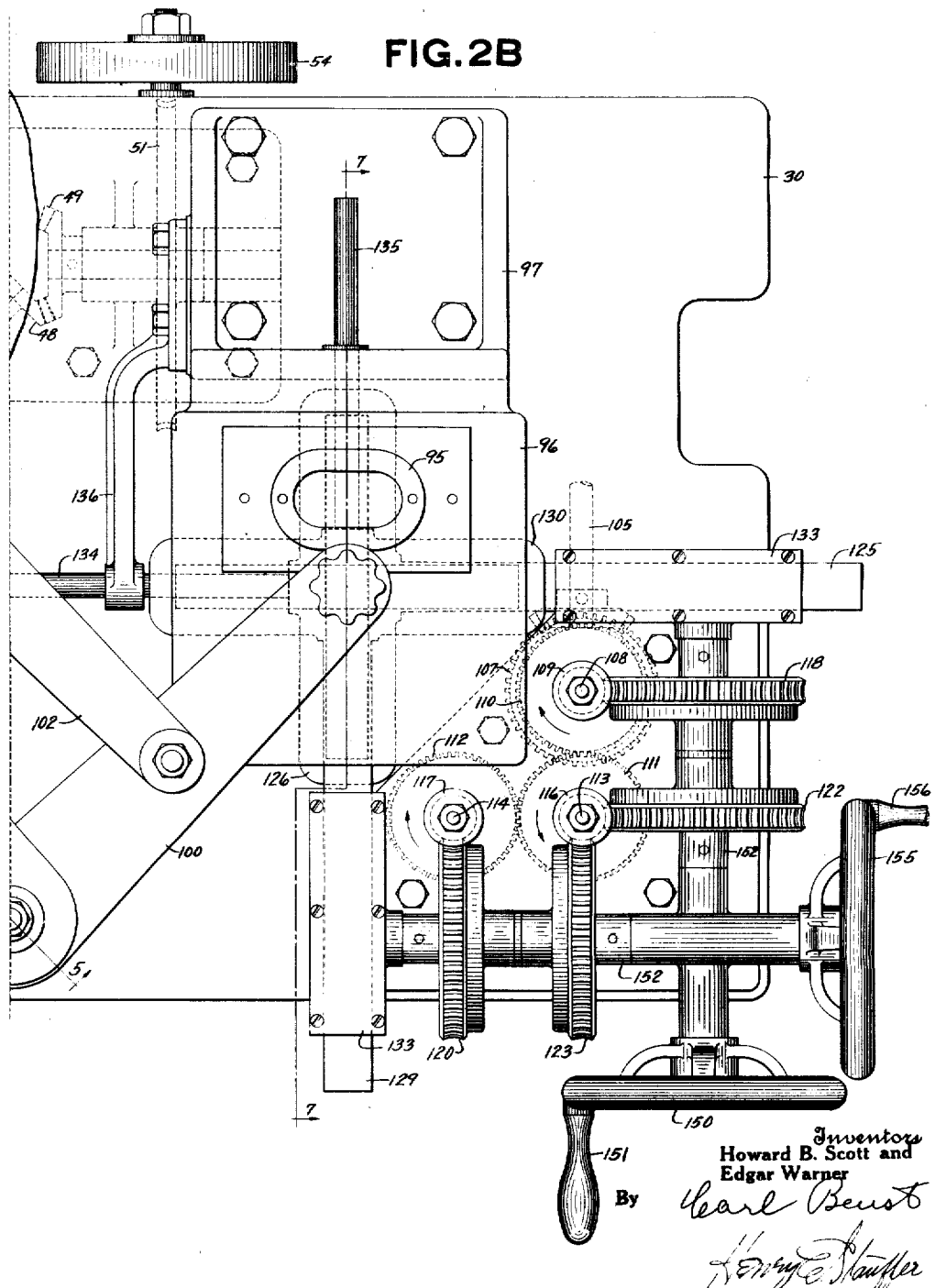

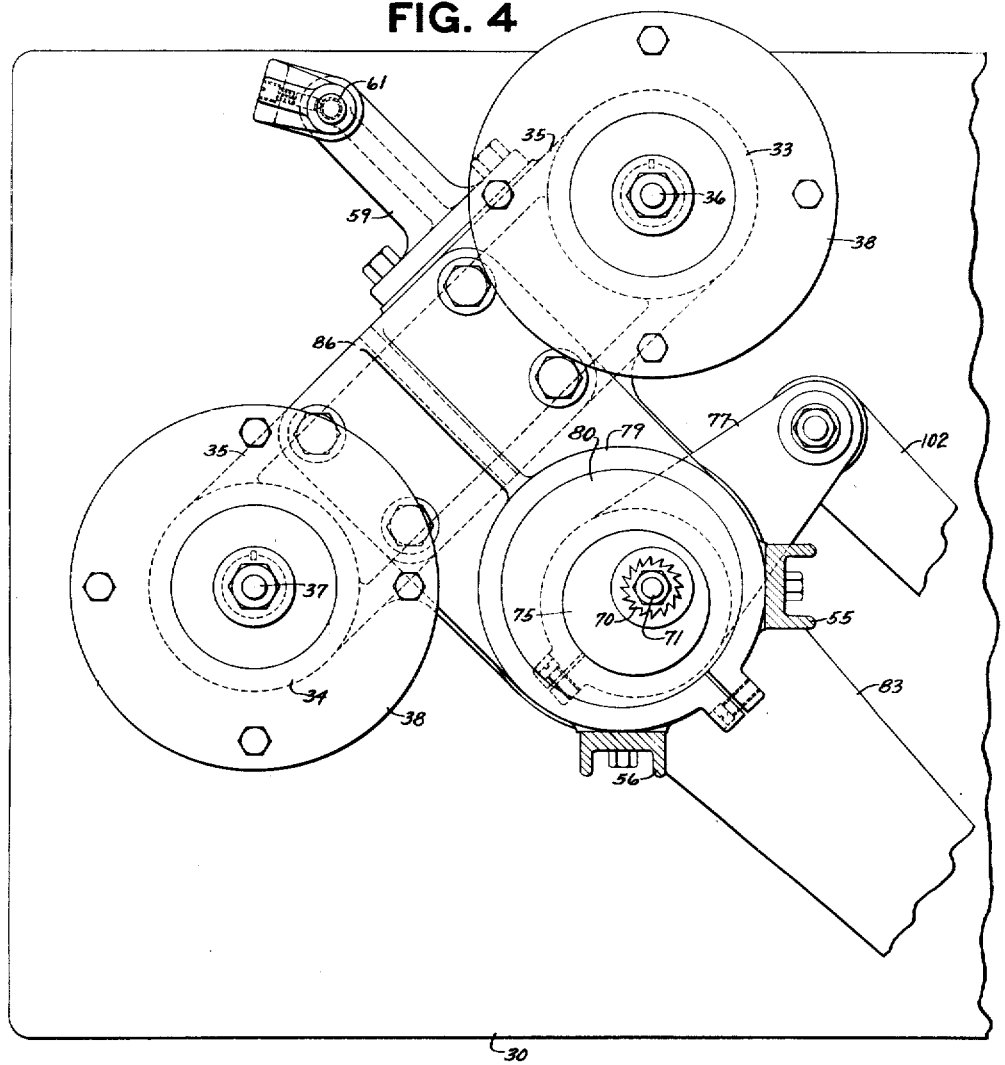

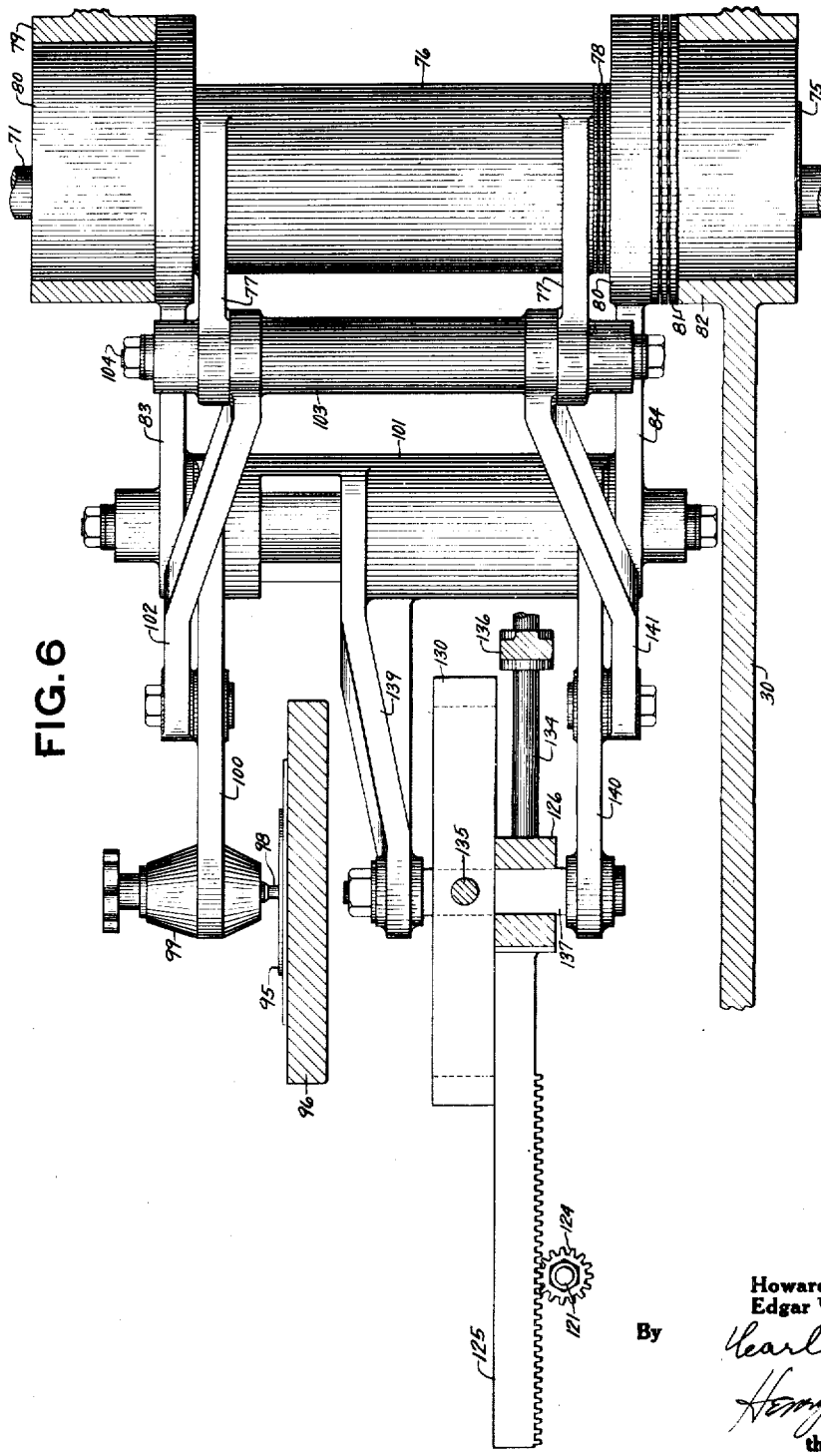

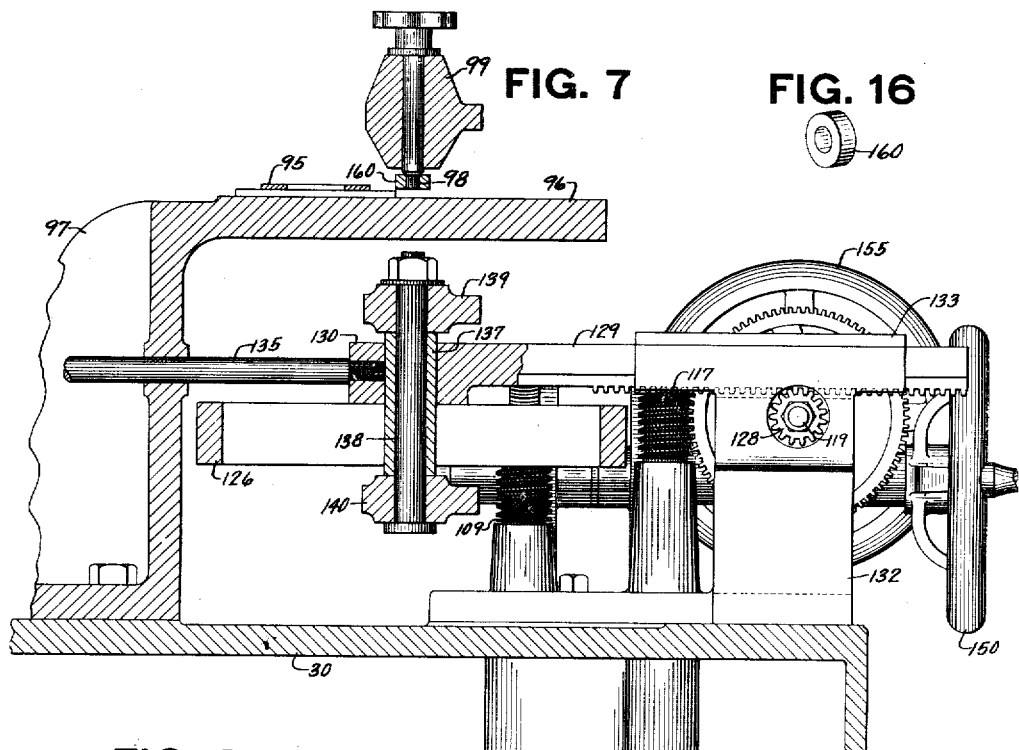
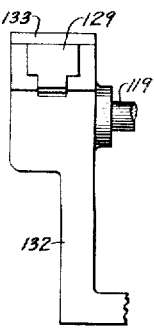
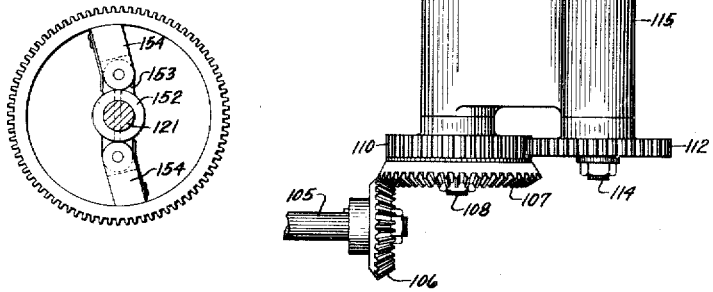
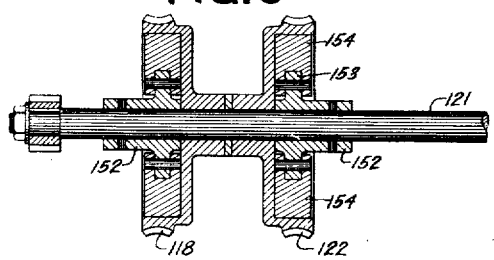

May 28, 1929.　　H. B. SCOTT ET AL　　1,714,926
CAM CUTTING MACHINE
Filed April 17, 1924　　9 Sheets-Sheet 8
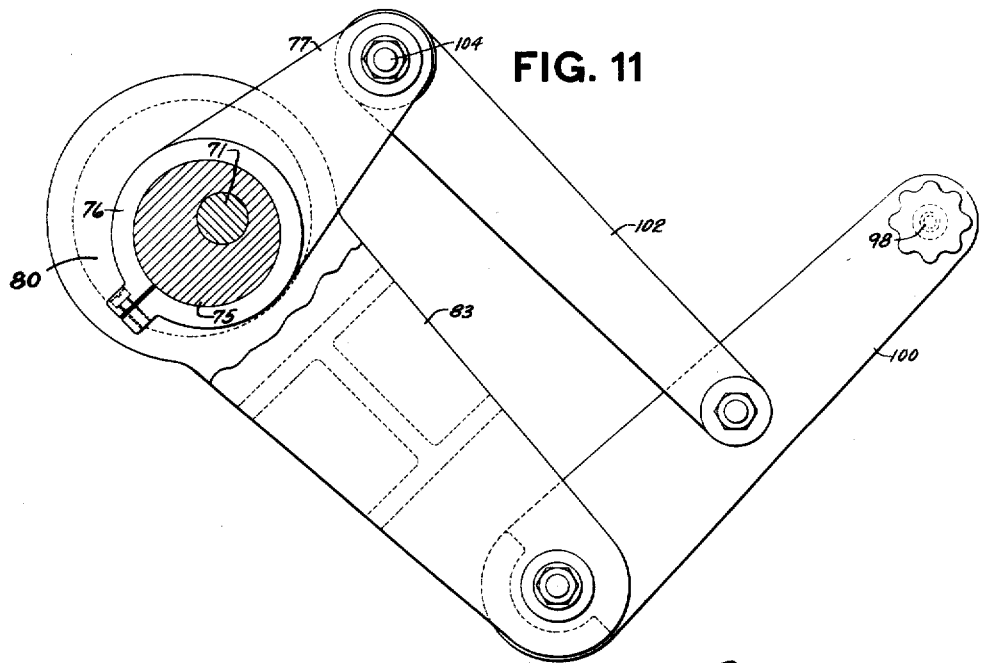
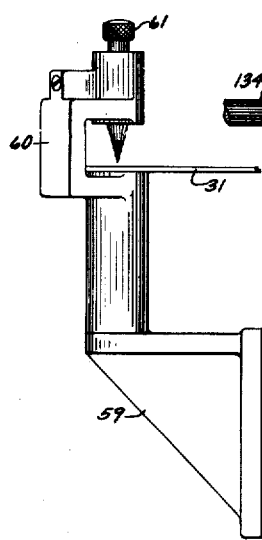
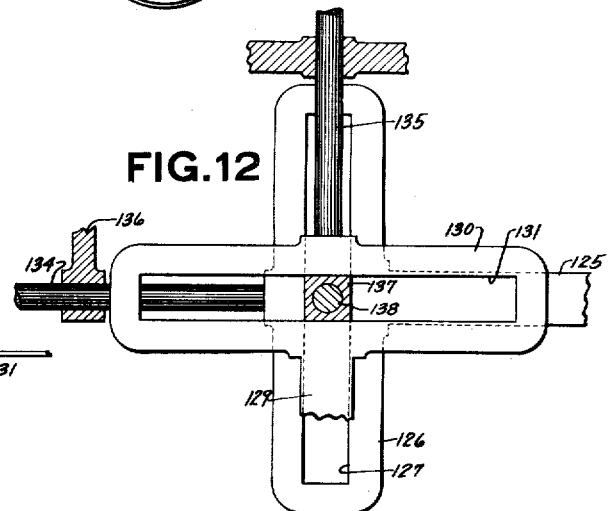
Inventors
Howard B. Scott and
Edgar Warner

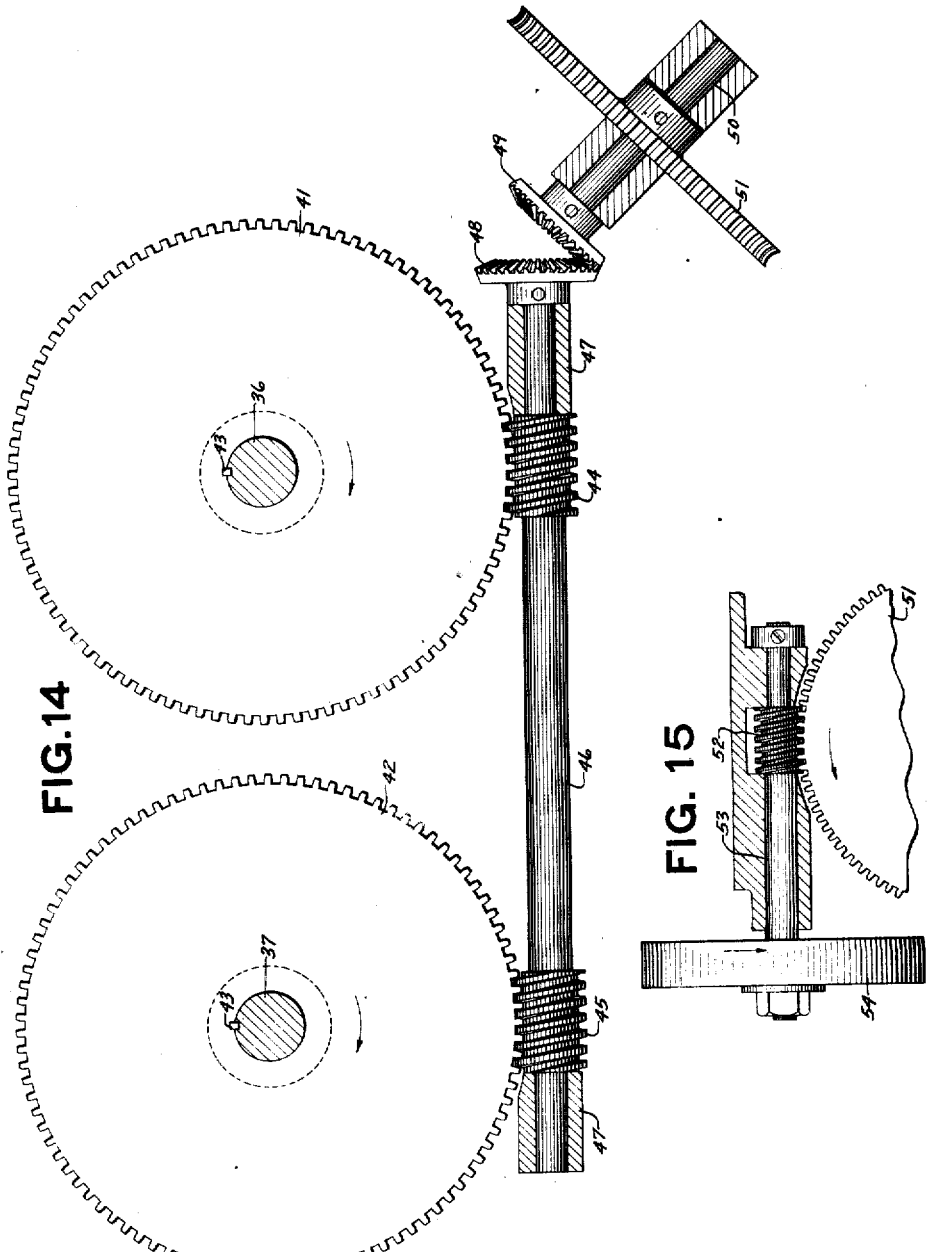

Patented May 28, 1929.

1,714,926

UNITED STATES PATENT OFFICE.

HOWARD B. SCOTT AND EDGAR WARNER, OF DAYTON, OHIO, ASSIGNORS, BY MESNE ASSIGNMENTS, TO THE NATIONAL CASH REGISTER COMPANY, OF DAYTON, OHIO, A CORPORATION OF MARYLAND.

CAM-CUTTING MACHINE.

Application filed April 17, 1924. Serial No. 707,140.

This invention relates to cam cutting machines and the like.

One object of the invention is to provide a machine in which the movement of a follower about the contour of a master character will be transmitted proportionately to a cutter, which will, in turn, cut corresponding depressions in the peripheries of two controlling disks.

Another object is to provide novel means for rotating the controlling disks while they are being cut.

Still another object includes power driven means for controlling the speed of said follower.

A further object is to provide manually operated means for moving said cutter.

With these and incidental objects in view, the invention includes certain novel features of construction and combinations of parts, the essential elements of which are set forth in appended claims, and a preferred form or embodiment of which is hereinafter described with reference to the drawings which accompany and form part of this specification.

Of said figures:

Fig. 1 is a perspective view of the machine.

Figs. 2$^A$ and 2$^B$ taken together constitute a top plan view of the device.

Fig. 4 is a detail top plan view of the disk-carrying spindles and the cutter mechanism, but with the disks removed.

Fig. 6 is a view in rear elevation of the arms used to transmit the movement of the follower to the cutter.

Fig. 7 is a vertical sectional view taken on line 7—7 of Fig. 2$^B$, looking in the direction of the arrows.

Fig. 8 is a detail view of one of the worm wheels, with its clutch mechanism.

Fig. 9 is a detail sectional view of a pair of the worm wheels, one of which is shown in Figs. 8.

Fig. 10 is a detail end elevation of one of the racks which drives the follower and its supporting bracket.

Fig. 11 is a detail top plan view, partly in section, of the arms which actuate the cutter in accordance with the movement of the follower.

Fig. 12 is a detail plan view of a portion of the mechanism for moving the follower.

Fig. 13 is a detail side elevation of a punch used to place a distinguishing mark on the disks.

Fig. 14 is a detail view of a portion of the mechanism for rotating the disks.

Fig. 15 is a detail view of another portion of the mechanism for rotating the disks, not shown in Fig. 14.

Fig. 16 is a detail perspective view of the collar which is placed on the follower to cause the disks to be so formed as to produce a rough cut of the character when used in the engraving machine.

Figure 1:
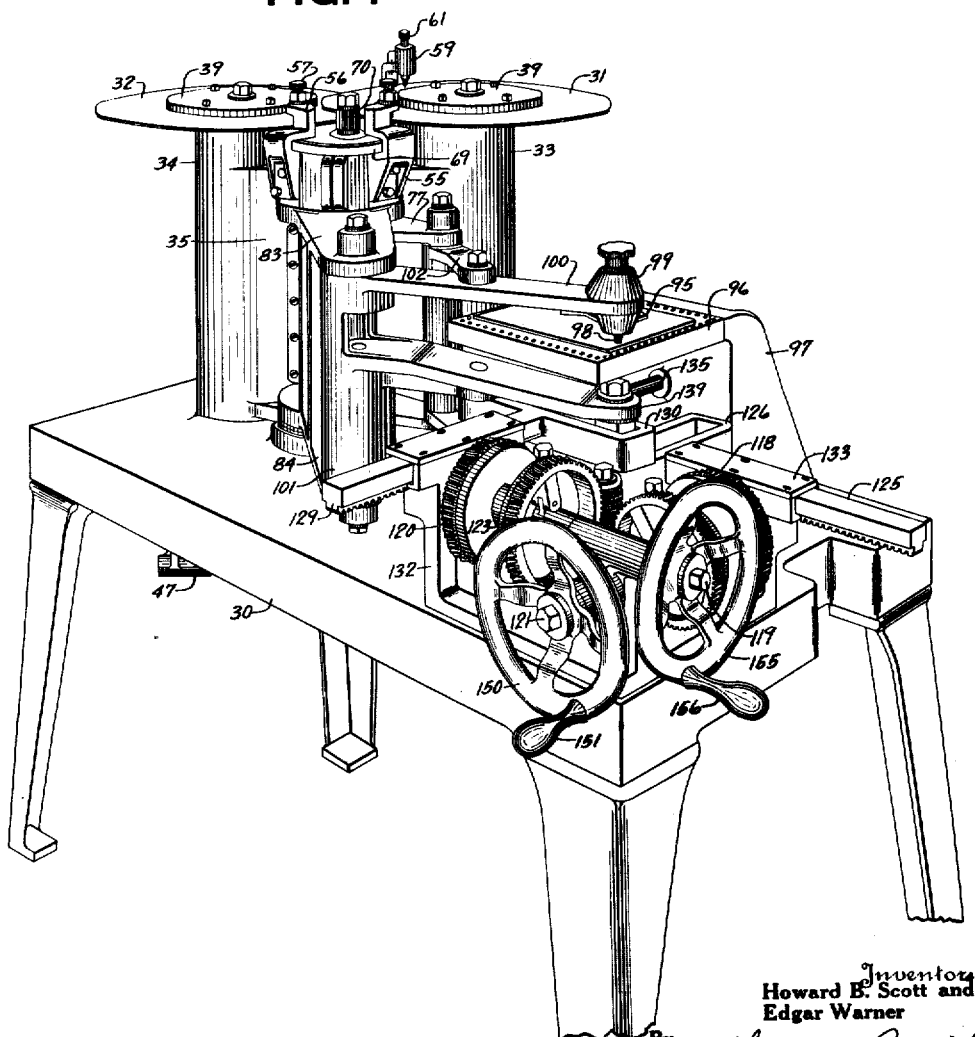

General description.

This invention is shown embodied in a machine which is used for the purpose of cutting a pair of disks which are, in turn, to be used to control the operation of another machine. This last mentioned machine is for the purpose of engraving numerals or other characters on type wheels, and it is shown and described in Letters Patent of the United States, No. 1,674,484, issued to the present inventors on June 19, 1928.

In order to cut these disks so that they will control the operation of the above mentioned machine, a master character is secured to a work table and a follower is caused to move about the contour of the character. The movement of the follower is transmitted through a link motion to a cutter which is rapidly rotated. The cutter is moved by a double eccentric device, which will be later described, and which serves the purpose of moving the cutter into contact with the periphery of one or the other or both of the two disks being cut, the movement being controlled by the movement of the follower about the master character.

The follower is first moved roughly about the outline of the master character, for the purpose of cutting the disks in such a way that they will, in turn, when operated in the machine above mentioned, cause a rough cut to be made, which is principally for the purpose of taking off surplus stock. The follower is then moved accurately about the outline of the master character, which causes the cutter to form another series of depressions in the peripheries of the disks for the purpose of causing the cutters in the engraving machine to make a finishing cut. A detailed description of the mechanism used for cutting the peripheries of the disks proportionately to the movement of the follower will now be given.

*Table.*

All of the mechanism of the machine is supported on a cast iron table 30 (Fig. 1) which is, in turn, supported by four legs.

*Cam disks.*

The machine is adapted to cut or form two cam disks, 31 and 32, simultaneously. Cast integral with the table 30 are two upwardly extending hollow standards 33 and 34 (Figs. 1, 4 and 5) which are preferably cylindrical in shape, and are connected by a web 35. Mounted in suitable bearings formed in the cylindrical portions of the standards 33 and 34 are shafts 36 and 37. At their upper ends each of these shafts has secured thereto a circular work-supporting plate 38 upon which rests the disk to be cut. After the disk is placed on the work-supporting plate 38, a similar plate 39 (Fig. 5) is placed on top of the disk and the two plates 38 and 39 are secured together by four cap screws which project through openings in the disk. The upper end of each of the shafts 36 and 37 is threaded, and after the clamping plate 39 is in position, a washer and a lock nut are screwed down onto said plate. The lower end of each of the shafts 36 and 37 is supported in a bearing 40, in line with and projecting downwardly from the table 30. On the lower ends of the shafts 36 and 37 are mounted worm-wheels 41 and 42, respectively, (Fig. 14) each connected to its shaft by means of a key 43 which fits in registering keyways cut in the worm-wheels and in the shafts. The worm-wheels 41 and 42 each mesh with worms 44 and 45, respectively, fast on a shaft 46 supported by hangers 47 depending from the table. At its right hand end (Fig. 14), the shaft 46 carries a bevel gear 48 which meshes with a similar bevel gear 49 fast on a shaft 50, also supported by a downwardly extending portion of the table 30. Fast on the shaft 50 is a worm-wheel 51 which in turn meshes with a worm 52 fast on a shaft 53. This shaft is also supported by a depending portion of the table 30 and at its left hand end (Fig. 15) carries a pulley 54 adapted to be driven by a belt from any suitable source of power.

Figure 2A:
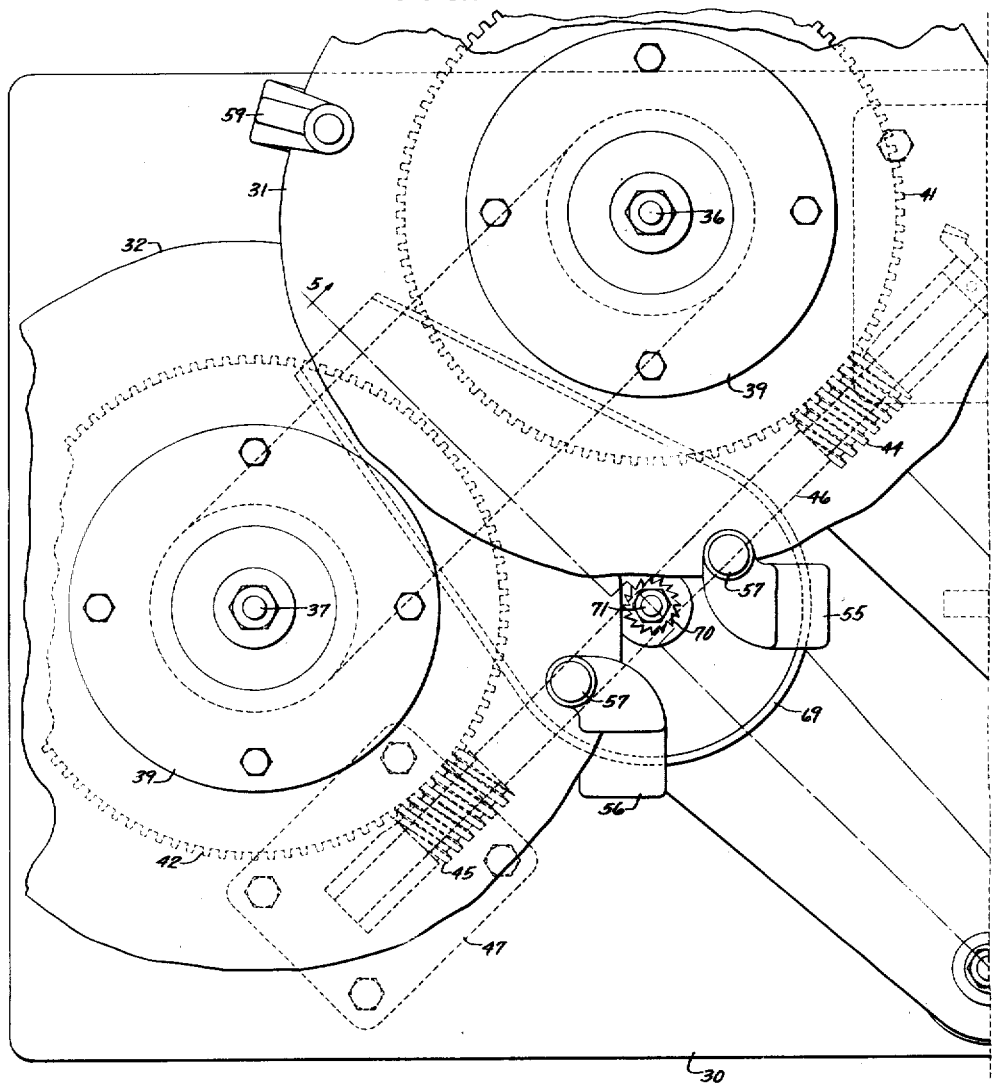
Figure 3:
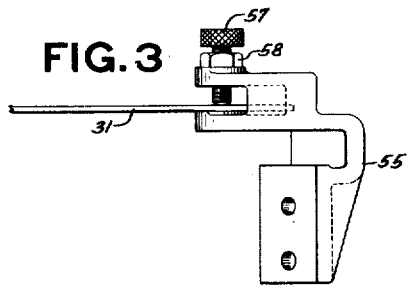
Fig. 3 is a detail side elevation of the brackets for guiding the disks while they are being cut.

It can be seen from the above description that when the pulley 54 is rotated clockwise (Fig. 15), the worm 52 will rotate the worm-wheel 51 in a counter-clockwise direction. This movement will be transmitted through the shaft 50 (Fig. 14), bevel gear 49, bevel gear 48, and shaft 46 to the two worms 44 and 45 which drive the worm-wheels 41 and 42. As these wheels are connected by the keys 43 to the shafts 36 and 37 which support the disks, it is evident that the disks will be slowly rotated in a clockwise direction, as seen in Fig. 2$^A$.

Means are provided to prevent any vertical movement of the disks while they are being cut. This is accomplished by brackets 55 and 56 (Figs. 1, 2$^A$ and 3), one for each of the disks, suitably supported in such a position that a U-shaped opening therein embraces the edge of its disk. The upper portion of the U-shaped member is drilled and tapped, and carries therein a set screw 57 which can be manually adjusted so that only sufficient space is left between the end of the screw and the bottom of the U-shaped opening for the disk to pass through. After this adjustment is made, a lock nut 58 may be tightened to hold the set screw in its adjusted position.

A device is also provided for conveniently marking one of the disks at any desired point, for subsequent identification. This means consists of a bracket 59 (Figs. 2$^A$ and 13), which has a jaw 60, adapted to embrace the edge of the disk 31. The upper portion of the jaw is cylindrically shaped and carries a vertically movable punch 61. Whenever it is desired to place an identifying mark on the disk 31, the punch 61 is given a sharp blow with a hammer, and an impression is thereby made on the disk.

*Cutter.*

Both of the disks 31 and 32, or other work supported on the shafts 36, 37, are adapted to be cut by a single cutter 70 (Figs. 1, 2$^A$, 4 and 5). This cutter is of conventional design and is removably mounted on the upper end of a vertical shaft 71 (Fig. 5) journaled within a rotatably adjustable sleeve 75. At its upper end, the shaft 71 is provided with a flange 72, and above this flange the shaft is reduced to accommodate the cutter 70. The cutter is spaced from the flange 72 by a spacing collar and is held in position on the shaft by means of a nut which screws onto the threaded end of the shaft.

The shaft 71 is rotated by a large pulley 73 secured to the lower end of the shaft by a nut 74. The pulley 73 may be driven by a belt or other suitable means from any desired source of power.

A combined trough and chute 69 (Figs. 1,

2ᴬ and 5) surrounds the shaft 71 just below the cutter for the purpose of collecting and disposing of the oil used and steel shavings from the disks during the cutting.

The cutter 70 is adapted to be moved in any desired direction by means of a double eccentric mounting, which will now be described. The shaft 71 is mounted eccentrically within the sleeve 75, as can be seen in Fig. 11. Secured to the sleeve 75 is a long cylindrical clamping member 76, which carries two horizontally extending parallel arms 77 (Figs. 6 and 11). When the arms 77 and clamping member 76 are rocked either clockwise or counter-clockwise, the sleeve 75 will be rotatably adjusted, and due to the eccentric mounting of the shaft 71 within the sleeve 75, will shift the shaft 71 bodily in one direction or the other to cause the cutter 70 to be moved in a general direction at right angles to the length of the arms 77, and relatively to the work. In order to facilitate ease of operation, the clamping member 76 is supported on a ballbearing 78, shown in Figs. 5 and 6.

The eccentric mounting for the cutter shaft 71 further includes upper and lower eccentric bearings 80 (Figs. 1, 5 and 11) embracing the upper and lower ends of the sleeve 75, and in which the sleeve is clamped.

A collar formed on the upper end of the lower eccentric bearing 80 rests upon a ball bearing 81 supported on the upper edge of a flanged opening 82 formed in the table 30 in which opening the lower eccentric bearing turns.

The thrust bearing 78 for the cylindrical clamping member 76 seats on the upper end of the lower eccentric 80.

The upper eccentric bearing 80 surrounds the sleeve 75 just above the elongated clamping member 76. A clamping ring 79 tightly embraces the upper eccentric bearing 80 and is provided with a laterally extending foot 86 (Figs. 4 and 5) overlying the web 35 between the two standards 33, 34 to which it is bolted.

The upper and lower eccentric bearings 80 are each provided with a laterally projecting horizontal arm 83 and 84, respectively, which are in turn connected by webs, the bearings 80, and arms 83 and 84 with their connecting webs being integrally cast. It can be seen from Fig. 11, that movement of the arms 83 and 84, either clockwise or counter-clockwise, will move the shaft 71 and its cutter 70, due to the eccentric position of the sleeve 75 in the eccentric bearings 80, in a general direction at right angles to the length of the arms 83 and 84 and relatively to the work.

As will be later described, the arms 77 of the eccentric sleeve 75 and the arms 83 and 84 of the eccentric bearings 80 are given simultaneous movements of varying extents, and these combined movements, due to the eccentric mounting of the shaft 71, move the cutter horizontally in any desired direction.

*Master character and follower.*

The movement of the cutter is determined and controlled by the movement of a follower about the contour of a master character, and the means whereby this follower receives and transmits its movement will now be described.

The master character 95 (Figs. 1, 2ᴮ and 7) is secured to a raised table 96 carried by a bracket 97 bolted to the table 30. This character may be of any desired form. A letter or numeral is usually used, but any other figure may be used with equal success. Cooperating with the master character is a follower 98 vertically slidable in the enlarged free end 99 of an arm 100. The arm 100 is integral with a tubular swivel 101 (Figs. 5 and 6) carried between and connecting the outer ends of the parallel arms 83 and 84 above mentioned. Threaded pintles 94 screwed into bushings 93 mounted in the outer ends of the arms 83, 84, are tapered at their inner ends to enter split brass bushings located in the upper and lower ends of the tubular swivel 101, to form pivot points on which the swivel rotates. This construction provides means for getting a fine adjustment of this bearing as well as means for compensating for wear therein.

The follower arm 100 is also connected to the arm 77 by means of a link 102 integral with a spacing member 103 (Fig. 6) supported on a rod 104 between the free ends of the arms 77. It can be seen from Fig. 11 that the pantographic arrangement of the arms shown therein is such that movement of the follower 98 in any direction will be transmitted proportionately to the cutter 70 by means of the double eccentric mechanism above described, which is adjusted by the pair of arms 77 and the pair of arms 83 and 84.

In order to give the cutter 70 its proportionate movement, as above described, it is necessary to move the follower 98 around the outline of the master character 95, and the means for accomplishing this function will now be described.

Fast on the inner end of a shaft 121 (Figs. 1, 2ᴮ, and 6 suitably supported on the bed plate or table 30) is a pinion 124 which meshes with teeth formed on a rack 125. Formed integral with the right hand end of the rack 125, as seen in Fig. 6, is a cross head 126 having a slot 127 formed therein (see also Fig. 12). A shaft 119 (Fig. 7) also supported on the bed plate or table 30, at right angles to the shaft 121, carries a pinion 128 at its inner end meshing with the teeth of a rack 129 carrying a cross head 130, which lies above and at right angles to, and is an exact duplicate of the cross head 126 and which has a slot 131 formed therein (Fig. 12), identical with the slot 127 previously described. Each of the racks 125 and 129 is supported by a bracket 132 (Figs. 1, 7 and 10), fastened to the table 30 and having channels cut in its' upwardly extending arms, in which the racks are adapted to slide. Plates 133 are fastened to the arms of the bracket 132, cover the channels and serve to guide the racks in their lateral movements. The cross-head 126 (Fig. 12) has a supporting and guide rod 134 projecting laterally therefrom and extending through an opening in a bracket 136 bolted to the side of the bracket 97 (Fig. 2$^B$) for the master character supporting-table. The cross-head 130 has a similar supporting and guide rod 135 which extends through an opening in bracket 97.

Each of the shafts 119 and 121 has a hand wheel 155 and 150, respectively, by means of which the above described mechanism can be manually operated to move the follower 98 in the following manner.

A guide block or traveler 137 extends vertically through the crossed slots 127 and 131 (Figs. 7 and 12) in the two superposed cross-heads or yokes, and is loosely mounted on a rod 138 which connects the ends of parallel arms 139 and 140 projecting laterally from the swivel member 101, previously described, and best shown in Fig. 6. The arm 140 is connected by a link 141 to the spacing member 103 above described.

It is evident from the above description that when the slotted cross-heads 126 and 130 are moved, the traveler 137 which connects the ends of arms 139 and 140 will be moved in any desired horizontal direction by the combined action of these cross-heads and therefore, the follower 98 will also be moved to a like extent, as it is directly connected through the arms 100 with the swivel 101. It can, therefore, be caused to follow exactly the outline of any desired master character.

Power control for follower moving mechanism.

It is necessary, in order to produce cams which will operate the above mentioned engraving machine smoothly and will control the cutters thereof in the most efficient manner, that means be included herein for controlling the speed at which the hand wheels 150 and 155 can be turned. This means will now be described. Any suitable source of power may be utilized to drive a suitably supported shaft 105 (Fig. 7) carrying a bevel pinion 106 meshing with a bevel gear 107 fast on a shaft 108 extending vertically through the bed plate 30. At its upper end, shaft 108 is provided with a worm 109. Fast to the bevel gear 107 is a gear 110 (Fig. 2$^B$) which meshes with a gear 111, which in turn meshes with a similar gear 112. These gears 111 and 112 are each fast on vertically extending shafts 113 and 114, which, together with the shaft 108, are supported in a casting 115 integral with the table 30. The shafts 113 and 114, like the shaft 108, carry at their upper ends worms 116 and 117. The worm 109 meshes with the manually rotatable worm-gear 118 (Fig. 2$^B$) loose on a shaft 121 (Fig. 1). The worm 117 meshes with a worm-wheel 120 loose on the remaining manually operable shaft 119 (Fig. 1), and the worm 116 meshes with a worm-wheel 122 and a worm-wheel 123 also loose on the shafts 121 and 119, respectively, as can be clearly seen in Figs. 1 and 2$^B$.

The shaft 105 is constantly driven in a clockwise direction, and this movement, through the bevel gear 107, rotates the gear 110, shaft 108, and worm 109 in a clockwise direction. As the gear 110 meshes with the gear 111, this gear, shaft 113, and worm 116 will be driven in a counter-clockwise direction, which will drive both the worm-wheels 122 and 123. The worm-wheel 122 is driven in a direction opposite to wheel 118 above mentioned. The gear 111 meshing with the gear 112 will cause this gear to be rotated in a clockwise direction, which will rotate the worm 117 and move the worm-wheel 120 in a direction opposite to that of worm-wheel 123.

Control of follower.

As above described, the hand wheel 150 is fast on shaft 121, which loosely carries the two worm-wheels 118 and 122, and these worm wheels, as well as the worm wheels 120 and 123, are each recessed or chambered on one side. Also fast on the shaft 121 are two hubs 152 (Figs. 8 and 9). Each of these hubs carries two radial oppositely projecting lugs 153 positioned within the chamber of its adjacent worm wheel, and to each of these lugs is pivoted one end of a friction clutch dog or member 154. The outer ends of the friction dogs or members 154 are adapted to cooperate with the inner periphery of each of the worm-wheels 118 and 122. It is evident from Fig. 8 that if the shaft 121 with its hubs 152 is rocked slightly counter-clockwise, the toggle joint connection between the lugs and the dogs 154 will straighten to force the friction members 154 out into contact with the inner peripheries of their appropriate worm-wheels, and therefore, the hand wheel 151 can only be rotated at the speed of the constantly driven mechanism, and the shaft 121 will be moved therewith so long as this condition is maintained. If the movement of the hand wheel 151 is stopped, then the friction members 154 above described will disengage from the inner periphery of the worm-wheel and the rotation thereof will have no effect on the shaft.

As already stated, there are two worm-wheels 118 and 122 on the shaft 121, these worm-wheels being driven in opposite directions, and from the above description it is clear that either one or the other of these worm-wheels will cooperate with the shaft through its appropriate friction members, and prevent any excessive speed in the movement of the follower.

The above described mechanism is shown in connection with the worm-wheels 118 and 122 and the shaft 121. This mechanism, however, is exactly duplicated on the shaft 119, which carries the worm-wheels 120 and 123 and a hand wheel 155 with a handle 156. As each of the shafts 119 and 121, through its appropriate rack and pinion connections is adapted to move its corresponding cross-head 130 or 126, it is evident that the combined movement given these cross-heads by the hand wheels 150 and 155 will cause the follower 98 to move about the outline of any desired master character 95, and therefore, through the above described connections, move the cutter 70 into and out of engagement with one or both of the cams 31, 32 being cut, to an extent proportionate with the movement of the follower about the master character.

*Operation.*

The first step in the operation is to place the disks 31, 32 which are to be cut, in position. The plates 39 are then placed over the disks and cap screws in the plates 38 and 39 are inserted and tightened, thereby holding the disks rigidly. The nuts on the upper ends of shafts 36 and 37 are also screwed down, and the work is thus secured to the shafts.

After the disks 31, 32 are fastened in position, the master character 95 which the disks are to reproduce when used in an engraving machine, is fastened to its supporting table 96. A spacing collar 160 (Figs. 7 and 16) is removably placed about the lower end of the follower so that it will be held a short distance away from the master character, in order that the first series of depressions made on the peripheral edges of the disks will produce a rough cut on the material to be worked upon in the engraving machine in which the disks 31, 32 are to be used.

Figure 5:
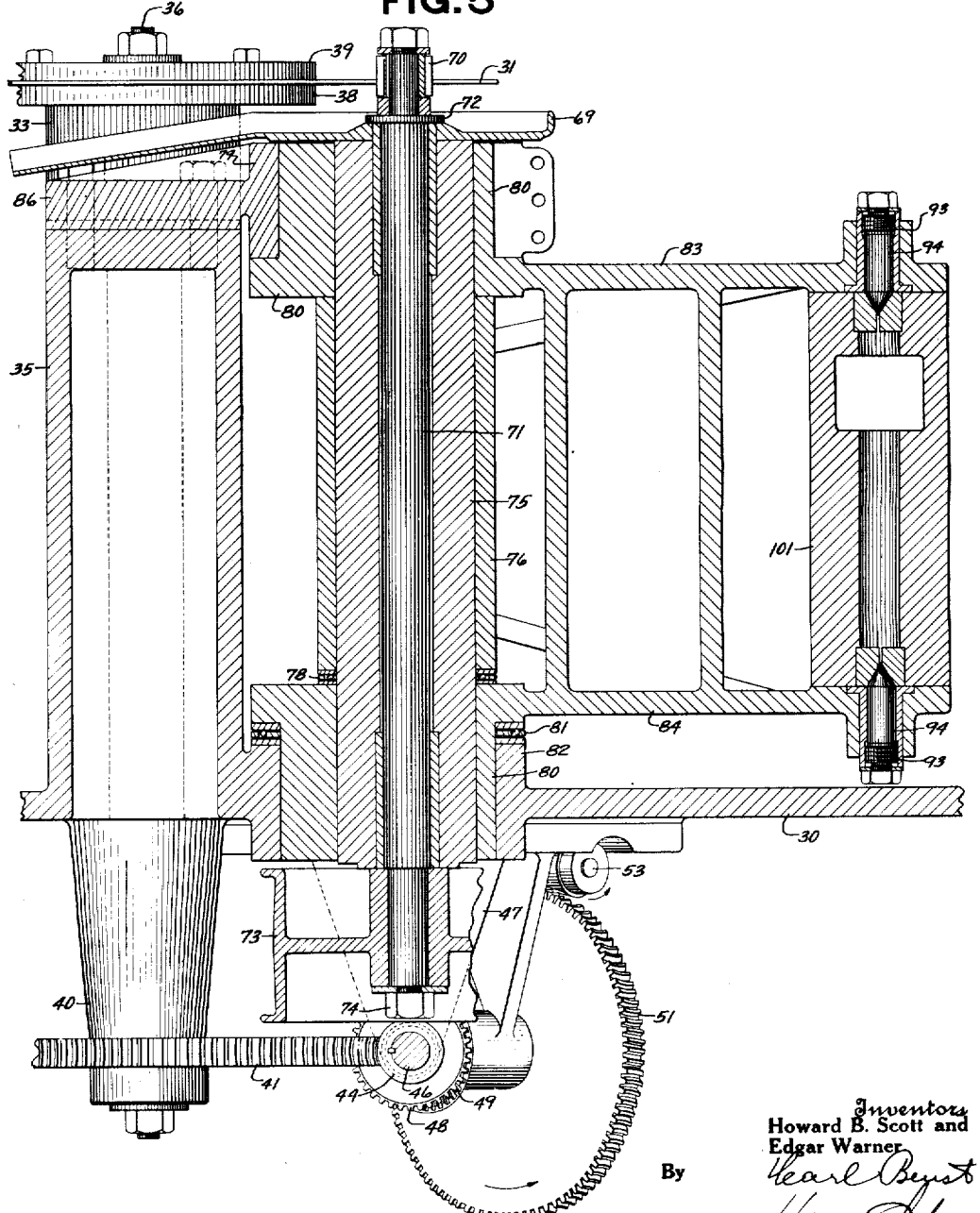
Fig. 5 is a vertical sectional view taken on the line 5—5 of Figs. 2$^A$ and 2$^B$, looking in the direction of the arrows.

The power is now switched on to the main drive shafts 53 (Fig. 15) and 105 (Fig. 7), and to the pulley 73 (Fig. 5).

Shaft 53 (Fig. 15), driven by pulley 54, imparts a slow and constant rotation through worm 52, worm wheel 51 (Fig. 14), shaft 50, gears 49 and 48, shaft 46, and worms 44 and 45 to the worm wheels 41 and 42 fast on the work-supporting shafts 36 and 37 to turn the shafts and the work in clockwise direction (Fig. 14).

The pulley 73 turns the cutter shaft 71 and the cutter 70 at a high rate of speed.

And shaft 105, through bevel gears 106 and 107, and spur gears 110 and 112, turn the vertical shafts 108 and 113 which drive the cutter shifting mechanism. As heretofore stated, the follower 98 is then moved about the outline of the master character by the hand wheels 150 and 155, as explained above.

If the character to be reproduced by the disks 31, 32 has an interior portion or closed loop which must be cut, such as "O", the follower is manually lifted over the rib or raised portion of the character to be reproduced, and the carrying mechanism therefor is moved to bring the follower over the interior portion. It is then lowered and the mechanism operated to cause it to follow the interior outline of the master character.

After the depressions which will reproduce the rough cut on the material under treatment in the engraving machine, have been formed in a part of the peripheries of the disks 31, 32, the above mentioned collar 160 is removed and the follower is manipulated to trace the exact outline of the master character, to cut the disks, so that the latter will make a finishing cut when in the engraving machine. When this final operation is finished, the cam disks 31, 32 are complete and may be removed from the machine.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, the combination of a plurality of supports mounted for rotation on different axes and each adapted to carry a disk, and means for simultaneously cutting different cam surfaces on said disks.

2. In a machine of the class described, the combination of a plurality of supports carrying disks, said supports being mounted for rotation on different axes, and a single cutter mounted for universal movement in a plane for cutting different cam surfaces on said disks.

3. In a machine of the class described, the combination of a plurality of supports carrying overlapping disks, said supports being rotatably mounted on different axes, and a single cutter adapted to cut the edges of said disks simultaneously.

4. In a machine of the class described, the combination of a plurality of rotatably mounted members supporting disks, movably mounted cutting means for simultaneously cutting cam surfaces on said disks, and means for controlling said cutting means to cut different cam surfaces on said disks.

5. In a machine of the class described, the combination of two members carrying disks, a movably mounted cutter, and means for moving said cutter during the operation of the machine to cut either disk separately or both simultaneously.

6. In a machine of the class described, the combination of a plurality of disk supporting means, and means for cutting the peripheries of said disks intermittently or continuously to different extents during a continuous operation of the machine.

7. In a machine of the class described, the combination of a plurality of disk supporting members, means for constantly rotating said members, and an eccentrically mounted cutter for cutting said disks differentially.

8. In a machine of the class described, the combination of a plurality of members carrying disks, an eccentrically mounted cutter for cutting said disks differentially, and manually controlled means for controlling the movement of said cutter.

9. In a machine of the class described, the combination of a plurality of members supporting disks, an eccentrically mounted cutter for cutting said disks differentially, a master character, and means for moving said cutter through said eccentric mounting under control of said master character.

10. In a machine of the class described, the combination of a plurality of members carrying disks, an eccentrically mounted cutter for cutting said disks differentially, a master character, a follower adapted to cooperate with said master character, and connections between said follower and said cutter.

11. In a machine of the class described, the combination of a plurality of members carrying disks, an eccentrically mounted cutter for cutting said disks differentially, a master character, a follower adapted to cooperate with said master character, and connections between said follower and said cutter so arranged that the movement received by said cutter is proportional to that given said follower.

12. In a machine of the class described, the combination of a plurality of members carrying disks, an eccentrically mounted cutter for cutting said disks differentially, a master character, a follower adapted to cooperate with said master character, connections between said follower and said cutter, and means for moving said follower.

13. In a machine of the class described, the combination of a plurality of members each carrying a disk, an eccentrically mounted cutter for cutting said disks differentially, a master character, a follower adapted to cooperate with said master character, connections between said follower and said cutter, manipulative means for moving said follower, and power driven means for controlling said manipulative means.

14. In a machine of the class described, the combination of a plurality of members each carrying a disk, an eccentrically mounted cutter for cutting said disks differentially, a master character, a follower adapted to cooperate with said master character, connections between said follower and said cutter, manipulative means for moving said follower, and constantly operated power-driven means for controlling the speed of said manipulative means.

15. In a machine of the class described, the combination of a plurality of members for carrying disks, a movably mounted cutter for cutting said disks differentially, a master character, a follower adapted to cooperate with said master character, connections between said follower and said cutter, means for moving said follower, and constantly operated means for limiting the speed of said follower moving means.

16. In a machine of the class described, the combination of a plurality of members carrying disks adapted to have their pehipheries cut to different extents, a shaft, a cutter mounted on said shaft, and a plurality of eccentrics for moving said cutter universally in one plane into and out of cutting relation with said disks.

17. In a machine of the class described, the combination of a plurality of members carrying disks adapted to have their peripheries cut to different extents, a shaft, a cutter mounted on said shaft, a sleeve in which said shaft is eccentrically mounted, and means for rotating said sleeve to move said cutter universally in one plane into or out of cutting relation with said disks.

18. In a machine of the class described, the combination of a plurality of members carrying disks adapted to have their peripheries cut to different extents, a shaft, a cutter mounted on said shaft, a sleeve in which said shaft is eccentrically mounted, a second sleeve fast to said first mentioned sleeve, and means integral with said second mentioned sleeve for moving said sleeves to cause the cutter to move eccentrically into and out of contact with said disks.

19. In a machine of the class described, the combination of a plurality of members carrying disks adapted to have their peripheries cut to different extents, a shaft, a cutter mounted on said shaft, a sleeve in which said shaft is eccentrically mounted, a second sleeve fast to said first mentioned sleeve, and a pair of arms integral with said second mentioned sleeve for moving said sleeves to cause the cutter to move eccentrically into and out of contact with said disks.

20. In a machine of the class described, the combination of a plurality of members carrying disks adapted to have their peripheries cut to different extents, a shaft, a cutter mounted on said shaft, a sleeve in which said shaft is eccentrically mounted, a member in which said sleeve is eccentrically mounted, and means for simultaneously adjusting both sleeve and member to move said cutter in any desired direction.

21. In a machine of the class described, the combination of a plurality of members carrying disks adapted to have their peripheries cut to different extents, a shaft, a cutter mounted on said shaft, a sleeve in which said shaft is eccentrically mounted, a member in which said sleeve is eccentrically mounted, an arm fast to said sleeve, an arm fast to said member, and means for moving said arms simultaneously to control the movement of said cutter.

22. In a machine of the class described, the combination of a plurality of members carrying disks adapted to have their peripheries cut to different extents, a shaft, a cutter mounted on said shaft, a sleeve in which said shaft is eccentrically mounted, a member in which said sleeve is eccentrically mounted, an arm fast to said sleeve, an arm fast to said member, another arm pivoted to said second mentioned arm, and means for connecting said first mentioned arm and said last mentioned arm in order that movement given said last mentioned arm may move said member and sleeve in opposite directions to position said cutter.

23. In a machine of the class described, the combination of a plurality of means supporting disks adapted to have their peripheries cut to different extents, a shaft, a cutter mounted on said shaft, a follower adapted to control said cutter, a sleeve in which said shaft is eccentrically mounted, a member in which said sleeve is eccentrically mounted, an arm fast to said sleeve, an arm fast to said member, a hub pivotally connected to said last mentioned arm, a pair of arms integral with said hub, a member joining said arms, and means cooperating with said member for moving said follower to the same extent and said cutter to a proportional extent.

24. In a machine of the class described, the combination of a plurality of means for supporting disks adapted to have their peripheries cut to different extents, a shaft, a cutter mounted on said shaft, a follower adapted to control said cutter, a sleeve in which said shaft is eccentrically mounted, a member in which said sleeve is eccentrically mounted, an arm fast to said sleeve, an arm fast to said member, a hub pivotally connected to said last mentioned arm, a pair of arms integral with said hub, a squared pin joining said arms, and two members having rectangular slots therein for jointly moving said pin and therefore said follower in any desired direction.

25. In a machine of the class described, the combination of a plurality of means for supporting disks adapted to have their peripheries cut to different extents, a shaft, a cutter mounted on said shaft, a follower adapted to control said cutter, a sleeve in which said shaft is eccentrically mounted, a member in which said sleeve is eccentrically mounted, an arm fast to said sleeve, an arm fast to said member, a hub carrying said last mentioned arm, a pair of arms integral with said hub, a squared pin joining said arms, and two members having rectangular slots therein said slots being positioned at right angles to each other whereby said squared pin and therefore said follower can be moved in any desired direction by the conjoint movement of said members.

26. In a machine of the class described, the combination of a plurality of members carrying disks adapted to have their peripheries cut to different extents, a shaft, a cutter mounted on said shaft, a follower adapted to control said cutter, a sleeve in which said shaft is eccentrically mounted, a member in which said sleeve is eccentrically mounted, an arm fast to said sleeve, an arm fast to said member, a hub carrying said last mentioned arm, a pair of arms integral with said hub, a squared pin joining said arms, two members having rectangular slots formed therein cooperating with said squared pin for moving it and the follower in any desired direction, and a rack integral with each of said members for moving it.

27. In a machine of the class described, the combination of a plurality of means supporting disks adapted to have their peripheries cut to different extents, a shaft, a cutter mounted on said shaft, a follower adapted to control said cutter, a sleeve in which said shaft is eccentrically mounted, a member in which said sleeve is eccentrically mounted, an arm fast to said sleeve, an arm fast to said member, a hub carrying said last mentioned arm, a pair of arms integral with said hub, a squared pin joining said arms, two members having rectangular slots formed therein cooperating with said squared pin for moving it and the follower in any desired direction, a rack integral with each of said members, and means for moving said racks.

28. In a machine of the class described, the combination of a plurality of members carrying disks adapted to have their peripheries cut to different extents, a shaft, a cutter mounted on said shaft, a follower adapted to control said cutter, a sleeve in which said shaft is eccentrically mounted, a member in which said sleeve is eccentrically mounted, an arm fast to said sleeve, an arm fast to said member, a hub carrying said last mentioned arm, a pair of arms integral with said hub, a squared pin joining said arms, two members having rectangular slots formed therein cooperating with said squared pin for moving it and the follower in any desired direction, and manually operated means for moving said racks.

29. In a machine of the class described, the combination of a plurality of members carrying disks, a cutter, a master character, a follower adapted to be moved about the master character to cause said cutter to cut said disks in accordance with said character, and means for causing said cutter to so cut said disks that they will represent the rough outline of the master character.

30. In a machine of the class described, the combination of a plurality of members carrying disks, a cutter, a master character, a follower adapted to be moved about the master character to cause said cutter to cut said disks in accordance with said character, and means cooperating with said follower for causing said cutter to so cut said disks that a portion of their periphery will represent the rough outline of the master character.

31. In a machine of the class described, the combination of a plurality of members carrying disks, a cutter, a master character, a follower adapted to be moved about the master character to cause said cutter to cut said disks in accordance with said character, and a collar adapted to be placed about the end of said follower for causing said cutter to so cut said disks that a portion of their periphery will represent the rough outline of the master character.

32. In a machine of the class described, the combination of a plurality of members supporting disks, an eccentrically mounted cutter for cutting said disks differentially, a master character, a follower adapted to cooperate with said master character, connections between said follower and said cutter, manually operated hand wheels movable in either direction for moving said follower, and constantly operated power driven means for limiting the speed of said hand wheels in either direction.

33. In a machine of the class described, the combination of a plurality of members carrying disks, a movably mounted cutter for cutting said disks differentially, a master character, a follower adapted to cooperate with said master character, connections between said follower and said cutter, two hand wheels for moving said follower, and a constantly operated mechanism for limiting the speed at which said hand wheels can be rotated in either direction.

34. In a machine of the class described, the combination of a plurality of members carrying disks, an eccentrically mounted cutter for cutting said disk differentially, means to control the movement of the cutter, constantly operating means, and a device intermediate the control means and the constantly operating means adapted to operatively connect one of said means with the other.

35. In a machine of the class described, the combination of a plurality of supports carrying overlapping disks, said supports being rotatably mounted on different axes, a cutter adapted to cut said disks simultaneously and differentially, means to control the movement of the cutter, continuously running means, and means adapted to operatively connect the two former means with each other to effect a control of one over the other.

In testimony whereof we affix our signatures.

HOWARD B. SCOTT.
EDGAR WARNER.

CERTIFICATE OF CORRECTION.

Patent No. 1,714,926.    Granted May 28, 1929, to

HOWARD B. SCOTT ET AL.

It is hereby certified that error appears in the printed specification of the above numbered patent requiring correction as follows: Page 1, line 50, for "Figs" read "Fig"; page 4, lines 75 and 76, strike out the words "the manually rotatable worm-gear 118 (Fig. 2b) loose on a" and insert instead "a worm-gear 118 (Fig. 2b) loose on the manually rotatable"; and that the said Letters Patent should be read with these corrections therein that the same may conform to the record of the case in the Patent Office.

Signed and sealed this 9th day of July, A. D. 1929.

(Seal)

M. J. Moore,
Acting Commissioner of Patents.

28. In a machine of the class described, the combination of a plurality of members carrying disks adapted to have their peripheries cut to different extents, a shaft, a cutter mounted on said shaft, a follower adapted to control said cutter, a sleeve in which said shaft is eccentrically mounted, a member in which said sleeve is eccentrically mounted, an arm fast to said sleeve, an arm fast to said member, a hub carrying said last mentioned arm, a pair of arms integral with said hub, a squared pin joining said arms, two members having rectangular slots formed therein cooperating with said squared pin for moving it and the follower in any desired direction, and manually operated means for moving said racks.

29. In a machine of the class described, the combination of a plurality of members carrying disks, a cutter, a master character, a follower adapted to be moved about the master character to cause said cutter to cut said disks in accordance with said character, and means for causing said cutter to so cut said disks that they will represent the rough outline of the master character.

30. In a machine of the class described, the combination of a plurality of members carrying disks, a cutter, a master character, a follower adapted to be moved about the master character to cause said cutter to cut said disks in accordance with said character, and means cooperating with said follower for causing said cutter to so cut said disks that a portion of their periphery will represent the rough outline of the master character.

31. In a machine of the class described, the combination of a plurality of members carrying disks, a cutter, a master character, a follower adapted to be moved about the master character to cause said cutter to cut said disks in accordance with said character, and a collar adapted to be placed about the end of said follower for causing said cutter to so cut said disks that a portion of their periphery will represent the rough outline of the master character.

32. In a machine of the class described, the combination of a plurality of members supporting disks, an eccentrically mounted cutter for cutting said disks differentially, a master character, a follower adapted to cooperate with said master character, connections between said follower and said cutter, manually operated hand wheels movable in either direction for moving said follower, and constantly operated power driven means for limiting the speed of said hand wheels in either direction.

33. In a machine of the class described, the combination of a plurality of members carrying disks, a movably mounted cutter for cutting said disks differentially, a master character, a follower adapted to cooperate with said master character, connections between said follower and said cutter, two hand wheels for moving said follower, and a constantly operated mechanism for limiting the speed at which said hand wheels can be rotated in either direction.

34. In a machine of the class described, the combination of a plurality of members carrying disks, an eccentrically mounted cutter for cutting said disk differentially, means to control the movement of the cutter, constantly operating means, and a device intermediate the control means and the constantly operating means adapted to operatively connect one of said means with the other.

35. In a machine of the class described, the combination of a plurality of supports carrying overlapping disks, said supports being rotatably mounted on different axes, a cutter adapted to cut said disks simultaneously and differentially, means to control the movement of the cutter, continuously running means, and means adapted to operatively connect the two former means with each other to effect a control of one over the other.

In testimony whereof we affix our signatures.

HOWARD B. SCOTT.
EDGAR WARNER.

CERTIFICATE OF CORRECTION.

Patent No. 1,714,926.　　　　　　　　　　　　　　Granted May 28, 1929, to

HOWARD B. SCOTT ET AL.

It is hereby certified that error appears in the printed specification of the above numbered patent requiring correction as follows: Page 1, line 50, for "Figs" read "Fig"; page 4, lines 75 and 76, strike out the words "the manually rotatable worm-gear 118 (Fig. 2b) loose on a" and insert instead "a worm-gear 118 (Fig. 2b) loose on the manually rotatable"; and that the said Letters Patent should be read with these corrections therein that the same may conform to the record of the case in the Patent Office.

Signed and sealed this 9th day of July, A. D. 1929.

(Seal)

M. J. Moore,
Acting Commissioner of Patents.